I. W. McGAFFEY.
Seed-Planter.
No. 47,029.
Patented Mar. 28, 1865.
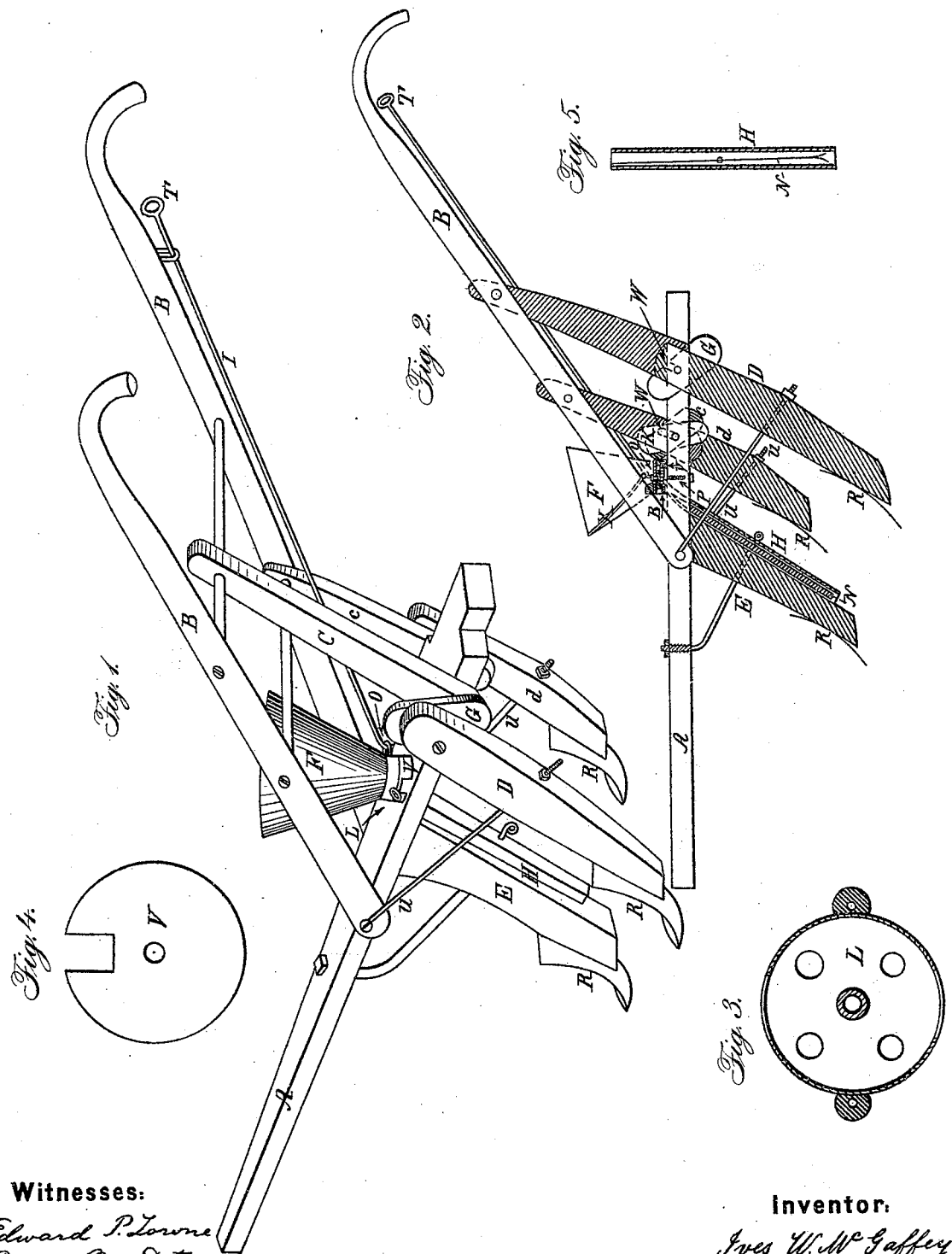
Witnesses:
Edward P. Towne
Payson M. Doty
Inventor:
Ives W. McGaffey

UNITED STATES PATENT OFFICE.

IVES W. McGAFFEY, OF CHICAGO, ILLINOIS.

COMBINED PLANTER AND CULTIVATOR.

Specification forming part of Letters Patent No. 47,029, dated March 28, 1865.

*To all whom it may concern:*

Be it known that I, IVES W. McGAFFEY, of Chicago, in the county of Cook and State of Illinois, have invented new and useful Improvements in Machines for Planting and Cultivating Corn; and I do hereby declare that the following is a full and exact description thereof, reference being had to the accompanying drawings, and to the letters of reference marked thereon.

The nature of my invention consists in the arrangement and operation of certain devices for dropping corn and other seeds, combined and operated in connection with a cultivator having its teeth and standards adjustable so they can be set in a proper position for opening a furrow or for covering the seed when used for planting, and readjusted to any desired position for cultivating the corn or tobacco, the construction and operation of which are more fully set forth in the following description and accompanying drawings, in which—

Figure 1 is a perspective view. Fig. 2 is a side view, showing a section of the seed-dropping apparatus and the standards and blocks in their relative position. Fig. 3 is a plain top view of the seed-dropping plate. Fig. 4 is a plan view of the platform upon which the dropping-plate rests. Fig. 5 is a section of the seed-tube, showing the oscillating valve.

This machine consists of a strong beam, A, to which the standards E D $d$ are attached. Upon these standards E D $d$ cultivator-teeth R R R are fixed, in the usual manner, by bolts or screws. The standards D $d$ are attached to the beam A by bolts, with a wedge-shaped block or blocks, G K J, between, by which the standards E D $d$ and teeth may be adjusted to various positions, as circumstances may require, for planting or cultivating. By turning the thick end of these blocks G K J up the teeth will be thrown nearer together, and by turning them down the teeth will be thrown farther apart, and by turning them to the rear the teeth will be inclined so as to throw a furrow to the center, and by turning them forward the teeth will be inclined so as to throw a furrow from the machine. It will be observed that a great variety of changes can thus be effected and to a greater or less degree, depending upon the slope and position of the wedges. Either one or two wedges may be used in this connection, as shown in the drawings, Fig. 2. The standards D $d$ are braced by rods $u\,u$, extending from the beam to their rear, and provided with a nut at the rear, by which the set or pitch of the tooth can be adjusted so it will work to the desired depth in hard or soft ground. The holes through the standards are made large enough to allow them to work freely on the bolts and braces as the wedges are turned to adjust the teeth. The standards are connected with the beam in such a manner that they may be easily detached by taking out the bolts, so that either one or two or all of them may be used at a time. By removing the rear standards we have a single-shovel plow, or by removing the front standard and using the rear teeth we have a complete double-shovel plow, possessing great advantages over those in common use in the adjustability of the teeth or shovels.

In implements of this kind it is very desirable that the handles should set at a proper height to be convenient to the operator, and as both tall and short men require to use the same machine it is important that the handles be adjustable, and I claim to have accomplished this object. The handles B B are bolted to the sides of the beam in front and supported at the rear by braces C $c$, which extend from the rounds of the handles to the beam, with slots $w\,w$ at their lower ends, through which the bolts pass which bolt them in place, so that by loosening the bolts the handles can be set to any desired height and made fast again by tightening up the bolts. These braces serve also as blocks to help support the rear standards.

The seed-box F is placed on the beam A, having two openings in its bottom to allow the seed to pass through onto the dropping-plate below, and is provided with a double flexible cut-off, which prevents the breaking of the grains as they are carried out by the dropping-plate.

Beneath the seed-box F is the dropping-plate L, of a circular form, with holes in it of the proper size for measuring and dropping the desired amount of seed. This plate is made reversible, and has holes of different sizes. Two of these holes are in use at the same time, so that one may be filling while the other is discharging, as the plate is made to oscillate horizontally by the finger-rod I and spring P. The dropping-plate rests upon an inclined platform, V, which has an opening in front to allow the seed to pass from the dropping-plate into the seed-tube H. The seed-box, dropping-plate, and platform are fastened to the beam A by a bolt which passes through their center and through the beam, which also serves as a pivot for the dropping-plate to swing on. The seed-tube H is provided with a valve, N, which extends up to the dropping-plate and is connected with and operated by it, with a double flange at its bottom end, so as to catch the charge of seed dropped from the plate above on one side and discharge from the other side alternately at each vibration. The object of this valve N is to prevent the seed from scattering and enable the operator to deposit the seed at the point desired in check-rowing. The dropping-plate is operated by the finger-rod I, either in connection with the spring P or independently, if desired. This rod is connected with the dropping-plate at O, and extends back to the point where the hand grasps the handle of the cultivator, and bent so as to be convenient for the fingers, which are inserted in the loop or handle, which is bent upon the end of the rod. This rod is made heavy enough so that the plate L may be operated by it, both forward and back, by opening and shutting the hand, similar to working a pair of shears.

Great difficulty has been experienced heretofore in this kind of seed-planters, where the dropping device is dependent upon a spring, which is liable to become weak from constant use and fail to perform its part, and thereby render the whole inoperative. This difficulty I have endeavored to overcome, first, by making the finger-rod so that the dropping device can be operated by it, both forward and back, independent of the spring, as hereinbefore described; secondly, by constructing a spring in a very durable form and arranging it so it can be readjusted if it should become too weak.

The spring P, when in use, is designed to throw the dropping-plate forward as it is drawn back by the finger-rod, and is placed beneath the platform V and connected with the dropping-plate at the side opposite the finger-rod, and extends through the beam in a coil around the bolt which holds the seed-box, with its lower end projecting beyond the nut and held in position by the nut pressing it against the beam. If the spring should become weakened by use, it can be readjusted by turning it up to any desired tension.

A movable partition, X, is fixed in the seed-box, which allows the seed to pass under it gradually, so as to keep a uniform pressure on the dropping-plate, whether the seed-box is full or partly full, thereby insuring greater uniformity in the dropping, and preventing the seed from clogging or packing, as it is liable to do when there is too great a depth of seed on the dropping-plate.

In the operation the field to be planted in check-rows must first be marked off one way in parallel lines the distance apart desired for the hills. The cultivator-teeth being properly adjusted for covering the seed, the machine is driven across the marks at right angles, the operator causing the dropping-plate to oscillate at the intersection of each of the previously-made marks.

I do not claim broadly the combination of a seed-dropping device with a cultivator. Neither do I claim the use of a slide or oscillating plate, or a finger-rod, or spring, or valve in the seed-tube, broadly; but What I do claim, and wish to secure by Letters Patent, is—

1. The slotted braces C c, in combination with the beam A and handles B, for the purpose of adjusting the latter, as set forth.

2. The reversible beveled blocks K, J, and G, when arranged to operate in combination with the beam A and plow-standards for the purpose of adjusting the latter, as described.

3. The hinged division-plate X, arranged to operate in connection with the seed-hopper, as and for the purpose set forth.

4. The adjustable spring P, in combination with the seed-plate L, when constructed and arranged to operate substantially as herein described.

5. The combination of rod I, plate L, and spring P, arranged to operate as and for the purpose set forth.

IVES W. McGAFFEY.

Witnesses:
EDWARD P. TOWNE,
PAYSON M. DOTY.